(12) United States Patent
Saeki

(10) Patent No.: US 11,980,971 B2
(45) Date of Patent: May 14, 2024

(54) LASER PROCESSING APPARATUS AND LASER PROCESSING METHOD

(71) Applicant: Via Mechanics, Ltd., Kanagawa (JP)

(72) Inventor: Yuki Saeki, Kanagawa (JP)

(73) Assignee: VIA MECHANICS, LTD., Kanagawa (JP)

( * ) Notice: Subject to any disclaimer, the term of this patent is extended or adjusted under 35 U.S.C. 154(b) by 607 days.

(21) Appl. No.: 17/132,987

(22) Filed: Dec. 23, 2020

(65) Prior Publication Data

US 2021/0187667 A1 Jun. 24, 2021

(30) Foreign Application Priority Data

Dec. 24, 2019 (JP) .................. 2019-232313

(51) Int. Cl.
| | |
|---|---|
| B23K 26/382 | (2014.01) |
| B23K 26/00 | (2014.01) |
| B23K 26/04 | (2014.01) |
| B23K 26/046 | (2014.01) |
| B23K 26/0622 | (2014.01) |
| B23K 26/064 | (2014.01) |
| B23K 26/082 | (2014.01) |

(52) U.S. Cl.
CPC ........ *B23K 26/382* (2015.10); *B23K 26/0006* (2013.01); *B23K 26/043* (2013.01); *B23K 26/046* (2013.01); *B23K 26/0622* (2015.10); *B23K 26/064* (2015.10); *B23K 26/082* (2015.10)

(58) Field of Classification Search
CPC .............. B23K 26/382; B23K 26/0006; B23K 26/043; B23K 26/082; B23K 26/0622; B23K 26/064; B23K 26/046
See application file for complete search history.

(56) References Cited

U.S. PATENT DOCUMENTS 6,407,363 B2   6/2002   Dunsky et al.

FOREIGN PATENT DOCUMENTS

| CN | 103203541 A | | 7/2013 |
|---|---|---|---|
| CN | 106624391 A | | 5/2017 |
| JP | 2009-012011 | * | 1/2009 |
| JP | 2015018095 A | | 1/2015 |
| JP | 2016203211 A | | 12/2016 |
| TW | 504425 B | | 10/2002 |
| WO | 02092276 A1 | | 11/2009 |

\* cited by examiner

*Primary Examiner* — Mathieu D Vargot
(74) *Attorney, Agent, or Firm* — McCormick, Paulding & Huber PLLC

(57) ABSTRACT

A purpose of the present invention is to quickly change a focal point of a laser emission system so that processing with high quality and good processing efficiency can be performed. In a laser processing apparatus including: a laser oscillator configured to output a laser pulse; a laser deflector configured to deflect the laser pulse in a two-dimensional direction; and a controller configured to control the laser oscillator and the laser deflector, the laser processing apparatus being configured to emit the laser pulse to a workpiece for processing the workpiece, the laser processing apparatus has a feature in which an electrooptic device capable of, under control of the controller, electrically changing a focal point of the laser pulse to be input to the laser deflector is arranged in an input side of the laser deflector.

4 Claims, 2 Drawing Sheets

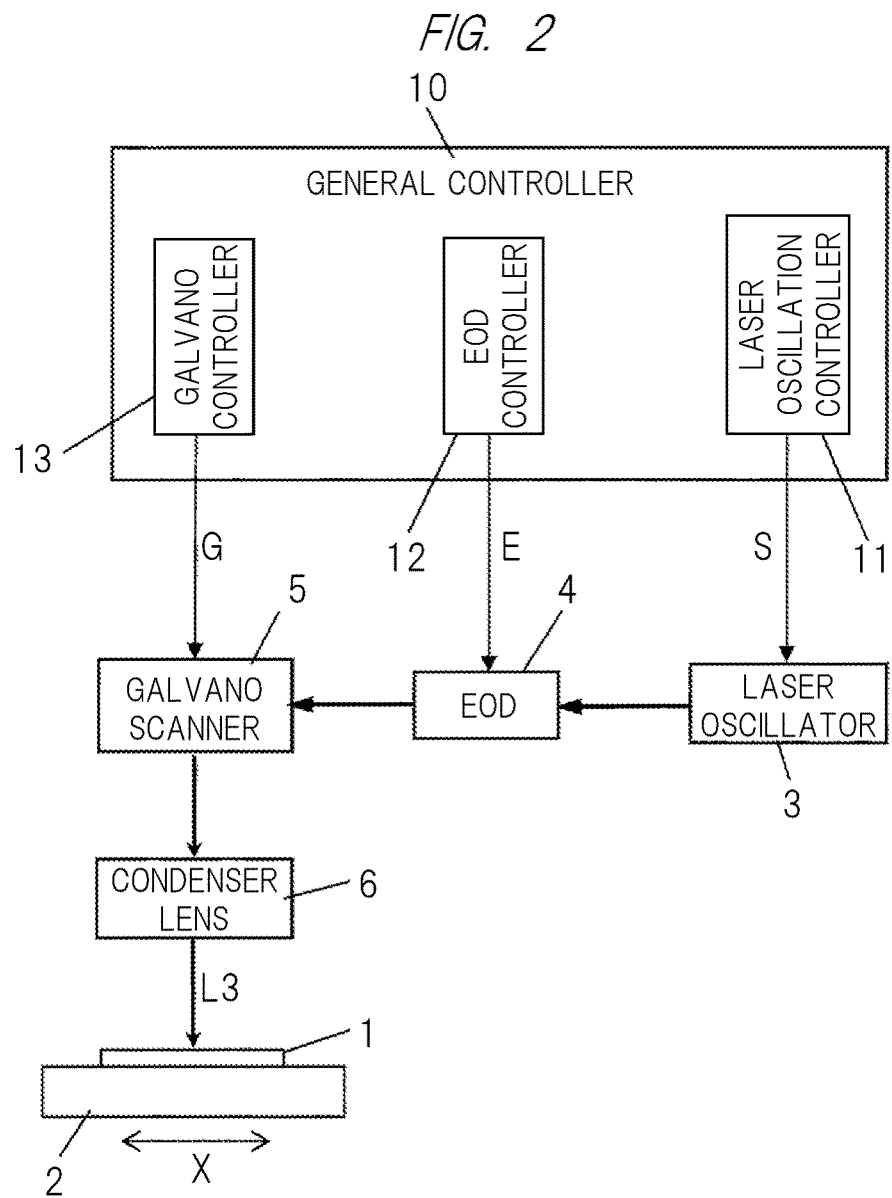
FIG. 2
FIG. 3A
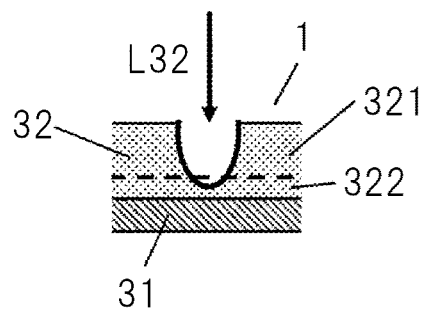
FIG. 3B
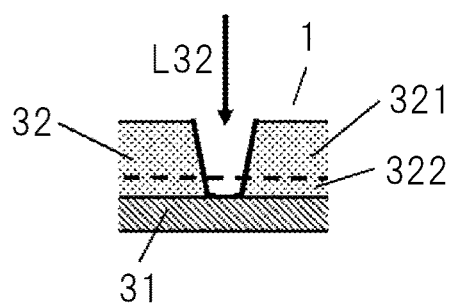

LASER PROCESSING APPARATUS AND LASER PROCESSING METHOD

CROSS-REFERENCE TO RELATED APPLICATION

The present application claims priority from Japanese Patent Application No. 2019-232313 filed on Dec. 24, 2019, the content of which is hereby incorporated by reference into this application.

TECHNICAL FIELD OF THE INVENTION

The present invention relates to a laser processing apparatus and a laser processing method for use in a hole-making processing using laser on a workpiece such as a printed board.

BACKGROUND OF THE INVENTION

In a laser processing apparatus that performs a hole-making processing using laser or others on a printed board, a laser pulse that is output from a laser oscillator is deflected in a two-dimensional direction by a Galvano scanner and is emitted through a condenser lens (a FO lens) to the printed board that is placed on a table. Modes of such laser processing apparatuses include so-called burst mode that shifts a processing target position while successively repeating the laser emission to the same processing target position, and this burst mode is disclosed in, for example, Japanese Patent Application Laid-Open Publication No. 2016-203211 (Patent Document 1, see the paragraph [0018]).

SUMMARY OF THE INVENTION

In a related-art burst mode, the laser is successively emitted without change in a focal point of a laser emission system. Therefore, the deeper the processing on the same processing target position goes, the less appropriate the focal point is, and thus, such a burst mode has a disadvantage that is a lack of an expected high-quality processing. Meanwhile, there is a cycle mode that shifts the processing target position while emitting single laser pulse onto each processing target position until the processing on all the processing target positions end, and then, repeating the same operation the necessary times. In such a cycle mode, the focal point of the laser emission system can be changed when the cycle shifts to a next cycle. However, in a related art, the focal point is changed by change in a distance of the laser emission system from the printed board, the change takes a while because of being accompanied by a mechanical operation. Besides, in the cycle mode, a processing table frequently moves, and therefore, the cycle mode has a disadvantage of a bad processing efficiency. Accordingly, a purpose of the present invention is to provide a quickly changeable focal point of the laser emission system so that processing with high quality and good processing efficiency can be performed.

A typical laser processing apparatus of the invention disclosed in the present application includes: a laser oscillator configured to output a laser pulse; a laser deflector configured to deflect the laser pulse in a two-dimensional direction; and a controller configured to control the laser oscillator and the laser deflector. The laser processing apparatus configured to process a workpiece by emitting the laser pulse thereto has a feature in which an electrooptic device capable of, under control of the controller, electrically changing a focal point of the laser pulse to be input to the laser deflector is arranged in an input side of the laser deflector.

A typical laser processing method of the same disclosed in the present application is a laser processing method for processing of inputting a laser pulse, that is output from a laser oscillator, to a laser deflector deflecting the laser pulse in a two-dimensional direction, and controlling the laser oscillator and the laser deflector to emit the laser pulse onto a workpiece, and the laser processing method has a feature in which a focal point of the laser pulse being input to the laser deflector is electrically changed by an electrooptic device.

Typical features of the present invention disclosed in the present application are as described above. However, features that are not described above will be explained in the following section "DESCRIPTIONS OF THE PREFERRED EMBODIMENTS", and are also described in CLAIMS.

According to the present invention, the focal point of the laser emission system is configured to be quickly changed, so that processing with high quality and good processing efficiency can be performed.

BRIEF DESCRIPTIONS OF THE DRAWINGS

FIG. 2 is a schematic configuration diagram of a laser processing apparatus according to a working example of the present invention;

FIG. 3A is a cross-sectional view showing a processing state of a printed board processed by a laser processing apparatus according to a working example of the present invention; and FIG. 3B is a cross-sectional view showing a processing state of a printed board processed by a laser processing apparatus according to a working example of the present invention.

DESCRIPTIONS OF THE PREFERRED EMBODIMENTS

Figure 1:
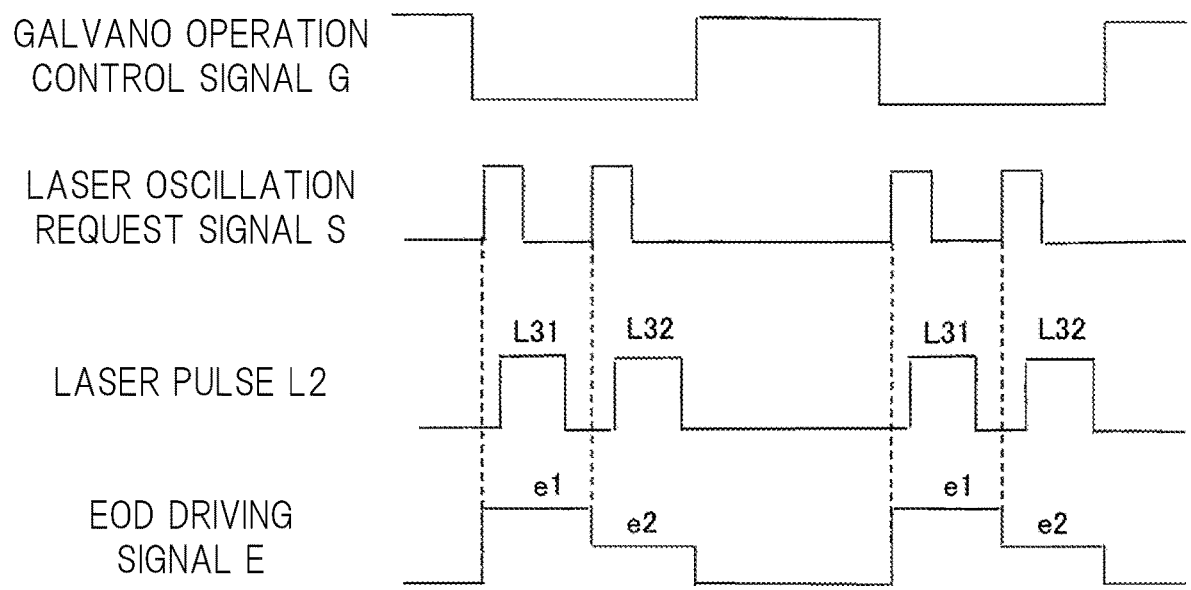
FIG. 1 is a timing chart of a laser processing apparatus according to a working example of the present invention.

FIG. 2 is a block diagram of a laser processing apparatus according to a working example of the present invention. Each constituent element and connecting wire being regarded to be necessary for explaining the present working example are mainly illustrated, and all of them that are necessary in the laser processing apparatus are not illustrated.

The laser processing apparatus that is described in the specification makes a hole in a printed board. However, the present invention is not limited to this, and is also applicable to a laser processing apparatus for use in processing a plurality of portions of a workpiece. In FIG. 2, a reference character "2" represents a processing table on which a printed board 1 to be processed is placed. This processing table 2 is configured to be movable in an X direction and a vertical direction to a drawing sheet. A reference character 3 represents a laser oscillator that oscillates a laser pulse L1, a reference character 4 represents an electrooptic device (hereinafter, abbreviated as EOD) that has a function of a variable focal lens capable of electrically changing a focal point of a laser pulse L1 emitted from the laser oscillator 3, a reference character 5 represents a Galvano scanner that deflects a laser pulse L2 emitted from the EOD 4, in a two-dimensional direction by using a Galvano mirror, and a reference character 6 represents a condenser lens that receives the laser pulse from the Galvano scanner 5 and emits a laser pulse L3 to a position to be holed in the printed board 1. Note that the EOD 4 is disclosed in, for example, Japanese Patent Application Laid-Open Publication No. 2015-18095 and an NTT technical journal ("High-Speed Variable Focal Lens using Single Crystal KTN", pp. 24 to 27, November 2009), and is a device that can quickly change the focal point under voltage control.

A reference character 10 represents a general controller that controls an operation of an entire apparatus, and is made of, for example, a processing unit as a center for program control, the processing unit having the constituent elements and the connecting wires also including logic constituent elements and connecting wires. Alternatively, some of the constituent elements may be separately arranged from the general controller. The general controller 10 has control functions in addition to the functions explained in the specification, and is connected even to a block not illustrated. The general controller 10 includes, therein, a laser oscillation controller 11 that outputs a laser oscillation request signal S for use in requesting the laser oscillator 3 to oscillate or attenuate the laser pulse L1, an EOD controller 12 that outputs an EOD driving signal E for use in controlling a focal point of the EOD 4, and a Galvano controller 13 that outputs a Galvano control signal G for use in controlling an operation of the Galvano scanner 5.

FIG. 1 is a timing chart obtained when the laser pulse L1 is oscillated from the laser oscillator 3 in the laser processing apparatus shown in FIG. 2. In this laser processing apparatus, the laser is oscillated by the laser oscillator 3 in synchronization with stop of rotation of the Galvano scanner 5, and the laser pulse L3 is emitted to the printed board 1. In FIG. 1, under the control of the general controller 10, the Galvano scanner 5 rotates when the Galvano operation control signal G is turned ON, the Galvano operation control signal G is turned OFF when the Galvano scanner 5 rotates and reaches a target position so that a positioning operation is completed, the laser oscillation request signal S that is output from the laser oscillation controller 11 is turned ON twice, and the laser oscillator 3 is requested to oscillate the laser pulse L1 twice. In this example (the burst mode), when the laser pulse L1 is oscillated twice from the laser oscillator 3, laser pulses L31 and L32 are successively emitted from the condenser lens 6 to the same processing target position of the printed board 1. In the middle of this operation, the EOD driving signal E is output from the EOD controller 12 to the EOD 4.

FIG. 3 is a cross-sectional view showing a processing state of the printed board 1 in this operation. In FIG. 3, the printed board 1 has a structure in which a resin layer 32 is layered on a cupper foil layer 31. As shown in FIG. 3A, the resin layer 32 is processed by the former laser pulse L31, a level of the EOD driving signal E in this processing becomes "e1", and the focal point of the EOD 4 is set so as to be mainly suitable for processing an upper layer 321 of the resin layer 32. Next, as shown in FIG. 3B, the resin layer 32 is similarly processed by the latter laser pulse L32, a level of the EOD driving signal E in this processing becomes "e2", and the focal point of the EOD 4 is set so as to be mainly suitable for processing a lower layer 322 of the resin layer 32. Then, the Galvano operation control signal G is turned ON after predetermined elapse of time since the ON of the laser oscillation request signal S, the Galvano scanner 5 rotates for emission to a next processing target position, and the operation is subsequently similarly repeated.

According to the above-described working examples, the focal point of the laser pulse L3 is quickly changed in the middle of the processing on the resin layer 32, so that the upper layer 321 and the lower layer 322 of the resin layer 32 can be independently processed by the laser pulses having the suitable focal points for the depths of the layers, and therefore, the high quality processing is achieved.

In the foregoing, the present invention has been concretely described on the basis of the embodiments. However, it is needless to say that the present invention is not limited to the foregoing embodiments and various alterations can be made within the scope of the present invention, and the present invention includes various modification examples. For example, the above-described working examples are the examples of the burst mode that shifts the processing target position while successively repeating the laser emission twice to the same processing target position. However, the number of times of the successive emission to each processing target position may be more, the focal point of the EOD 4 may be changed for each laser emission, and laser emission without the focal point change may be inserted in the middle of the operation. Further, although the laser pulse L1 that is output from the laser oscillator 3 is directly input to the EOD 4, a part of the laser pulse L1 may be taken off by an audio optical device that is arranged between the laser oscillator and the EOD and may be input to the EOD 4. Still further, in FIG. 3, in the processing on both the cupper foil layer 31 and the resin layer 32, the focal point of the EOD 4 may be different between the cupper foil layer 31 and the resin layer 32. Still further, the change in the focal point of the EOD 4 may be not always necessary depending on a material of the workpiece, and the laser processing apparatus may have a processing mode that makes the focal point constant.

What is claimed is:

1. A laser processing apparatus comprising:
a laser oscillator configured to output a laser pulse;
a laser deflector configured to deflect the laser pulse in a two-dimensional direction; and
a controller configured to control the laser oscillator and the laser deflector,
the laser processing apparatus being configured to emit the laser pulse to a workpiece for processing the workpiece,
wherein an electrooptic device capable of, under control of the controller, electrically changing a focal point of the laser pulse to be input to the laser deflector is arranged in an input side of the laser deflector, and
wherein the controller changes the focal point of the laser pulse stepwise in one direction by applying a stepwise voltage to the electrooptic device.

2. The laser processing apparatus according to claim 1, wherein, when the laser pulse is repeatedly emitted to the same processing target position of the workpiece, the controller controls the electrooptic device so as to change the focal point made by the electrooptic device.

3. A laser processing method comprising the steps of:
inputting a laser pulse, that is output from a laser oscillator, to a laser deflector configured to deflect the laser pulse in a two-dimensional direction;
controlling the laser oscillator and the laser deflector; and
emitting the laser pulse to a workpiece for processing the workpiece,
wherein a focal point of the laser pulse to be input to the laser deflector is electrically changed by an electrooptic device, and wherein, when the focal point of the laser pulse is changed, the focal point of the laser pulse is changed stepwise in one direction by applying a stepwise voltage to the electrooptic device.

4. The laser processing method according to claim 3, wherein, when the laser pulse is repeatedly emitted to the same processing target position of the workpiece, the focal point made by the electrooptic device is changed.

* * * * *